United States Patent [19]

Camras

[11] 4,020,999
[45] May 3, 1977

[54] ENDLESS LOOP CARTRIDGE FOR VIDEO

[75] Inventor: Marvin Camras, Glencoe, Ill.

[73] Assignee: IIT Research Institute, Chicago, Ill.

[22] Filed: Apr. 2, 1973

[21] Appl. No.: 346,869

Related U.S. Application Data

[63] Continuation-in-part of Ser No. 60,806, Aug. 4, 1970, Pat. No. 3,725,608, Ser. No. 258,750, June 1, 1972, Pat. No. 3,805,288, and Ser. No. 282,275, Aug. 21, 1972, Pat. No. 3,849,797.

[52] U.S. Cl. .................................. 242/55.19 A
[51] Int. Cl.² .................................. G11B 23/10
[58] Field of Search ............ 242/55.19 A, 55.19 R, 242/55.18, 199, 200; 179/100.2 Z; 274/4 B; 360/93

[56] References Cited

UNITED STATES PATENTS

| | | | |
|---|---|---|---|
| 2,911,215 | 11/1959 | Cousino | 242/55.19 A |
| 2,921,787 | 1/1960 | Cousino | 242/55.19 A |
| 3,235,195 | 2/1966 | Hebb et al. | 242/55.19 A |

*Primary Examiner*—Billy S. Taylor
*Attorney, Agent, or Firm*—Hill, Gross, Simpson, Van Santen, Steadman, Chiara & Simpson

[57] ABSTRACT

A video tape cartridge of endless loop configuration capable of tape speeds suitable for longitudinal scan television recording while providing one hour or more of continuous playing time on one-quarter inch width tape. In an illustrative embodiment tape guides within the cartridge are shiftable from a loading position to an operating position without a substantial change in the length of the tape path to accommodate scanning of the tape at a tensioned loop closely adjacent the capstan.

4 Claims, 9 Drawing Figures

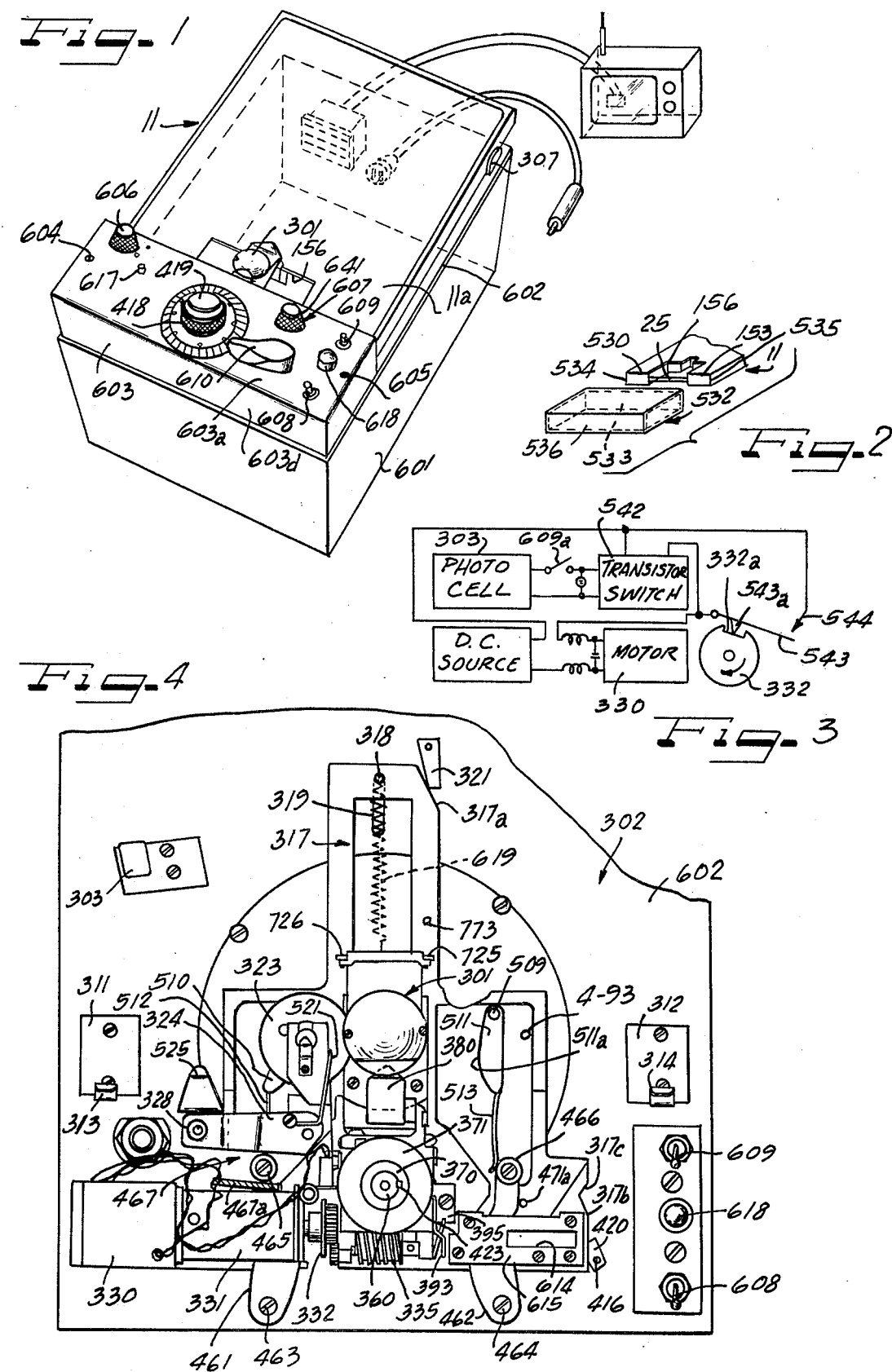

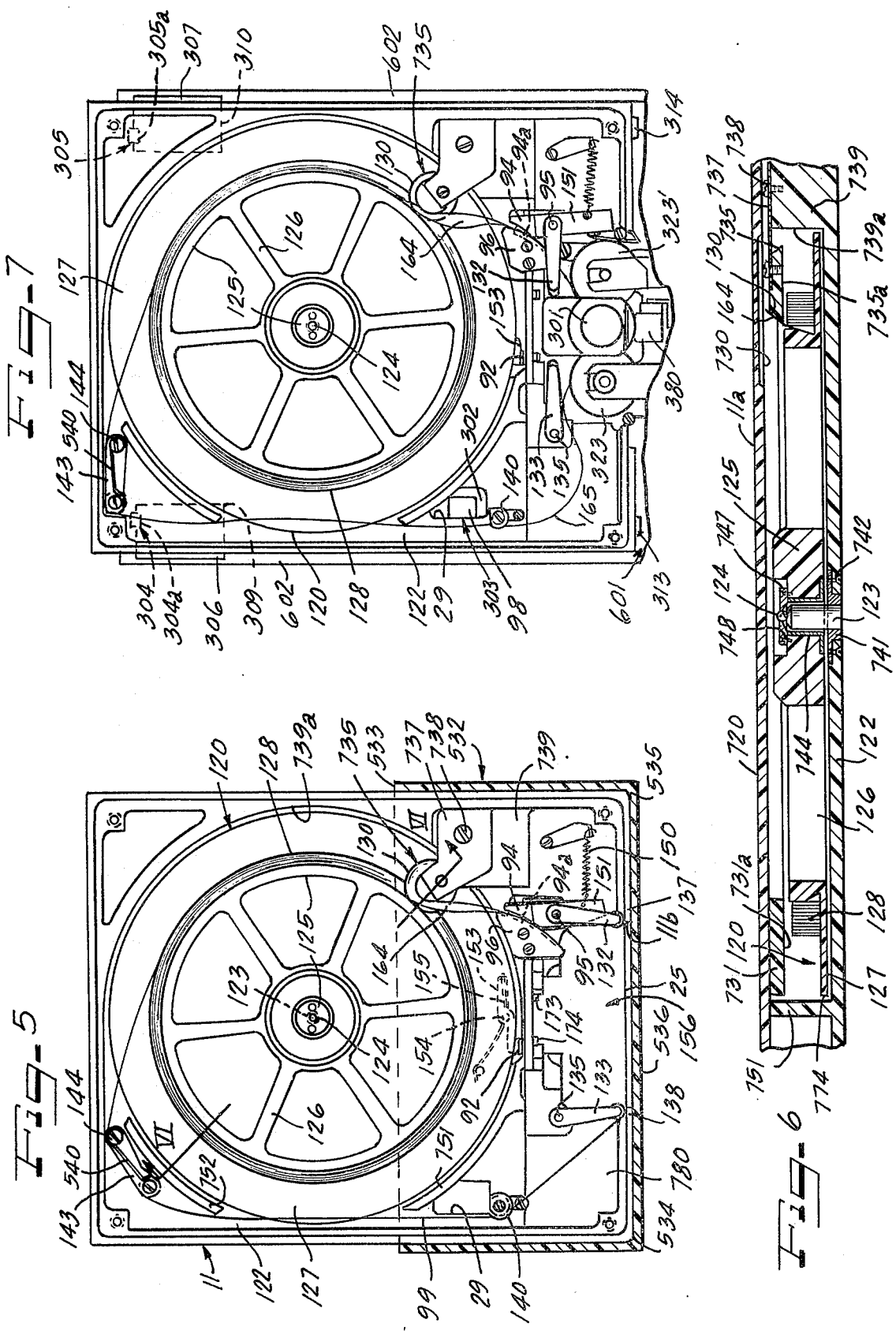

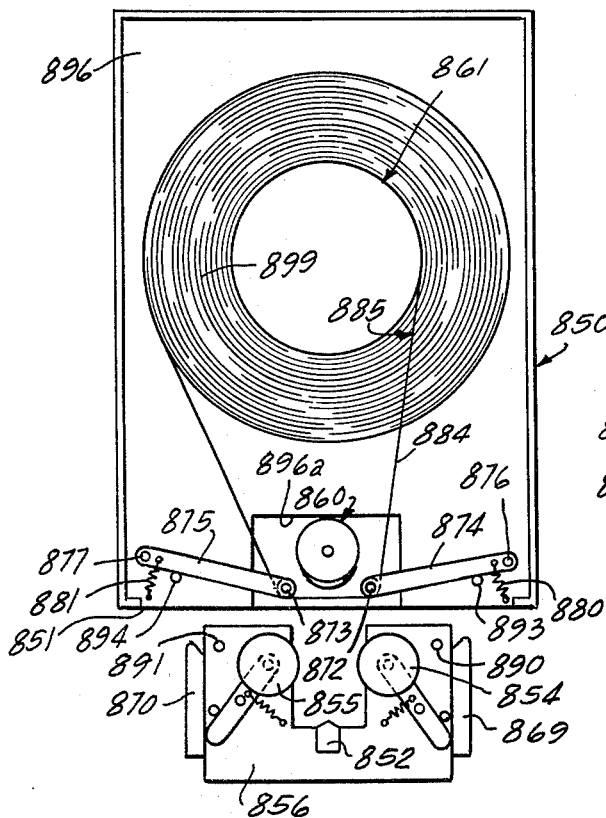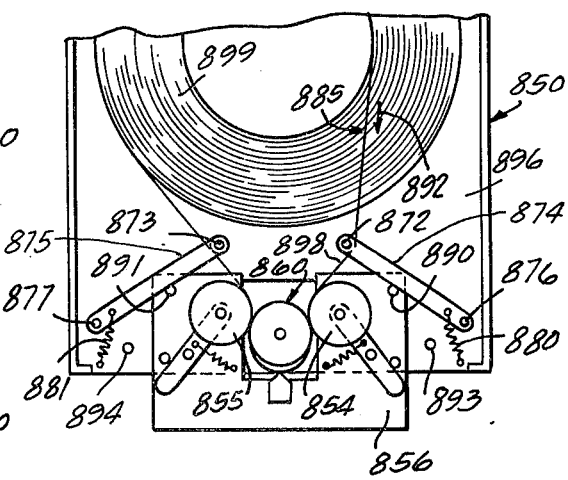

ENDLESS LOOP CARTRIDGE FOR VIDEO

CROSS-REFERENCES TO RELATED APPLICATIONS

The present application is a continuation in part of my pending applications U.S. Ser. No. 60,806 filed Aug. 4, 1970 (now U.S. Pat. No. 3,725,608 issued Apr. 3, 1973), U.S. Ser. No. 258,750 filed June 1, 1972 (now U.S. Pat. No. 3,805,288 issued Apr. 16, 1974) and U.S. Ser. No. 282,275 filed Aug. 21, 1972 (now U.S. Pat. No. 3,849,797 issued Nov. 19, 1972).

Reference is made pursuant to 35 U.S.C. 120 to the aforementioned pending applications and also to my prior application U.S. Ser. No. 831,352 filed June 9, 1969, now U.S. Pat. No. 3,686,433 issued August 22, 1972, said application Ser. No. 258,750 being a division of Ser. No. 831,352.

SUMMARY OF THE INVENTION

This invention relates to a cartridge type video transducer system, and particularly to an endless loop magnetic tape cartridge for use in such a system.

An object of the present invention is provide an endless loop cartridge capable of providing record tape speeds as high as 120 inches per second or more, if desired, with a desired low degree of tape flutter at the transducer head.

Another object is to provide an endless loop tape cartridge capable of providing 1 hour or more of playing time in conjunction with a conventional broadcast television receiver, while utilizing only a single non-rotating transducer head, and preferably with the use of a gradual shifting of the head in the lateral direction in moving between longitudinal tracks on the tape to avoid any discontinuity in the playback process.

A further object of the invention is to provide a simple and economical endless loop tape cartridge for a video transducing system having very few moving parts and a compact configuration, and yet which provides an extremely steady motion at the transducing location.

Another and further object of the invention is to provide a novel endless loop cartridge for a magnetic tape transducer system wherein a precision type capstan drive assembly is engageable and disengageable with the tape record medium without the necessity for manual threading of the record tape.

A further object of the invention is to proivde such an endless loop cartridge wherein the operating tape path is free of sharp bends and yet wherein the cartridge has an extremely compact configuration.

A feature of the invention resides in the provision of a cartridge for a longitudinal scanning type video transducing system capable of transducing television signals at relatively low tape speeds of the order of 30 inches per second.

Still other objects and features relate to a cartridge adapted for coupling to a stable drive system; having no rotating parts except a tape turntable; and/or requiring no rollers or precision parts that affect the drive accuracy.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a somewhat diagrammatic perspective view showing a tape transport with an endless loop cartridge in accordance with the present invention in operating position thereon;

FIG. 2 is somewhat diagrammatic fragmentary perspective view showing a cover for sliding engagement with the end of the cartridge of FIG. 1, and applicable to any of the embodiments herein, for the purpose of completely enclosing the tape when not in use;

FIG. 3 is a diagrammatic illustration of an electric circuit for controlling the gradual shifting of the head from one channel to the next in response to a signal from a photocell or from the manual switch of FIG. 1;

FIG. 4 is a fragmentary somewhat diagrammatic plan view of the tape transport of FIG. 1, but with the cover enclosing operating components of the transport mechanism being removed, the parts of the mechanism being in the operating position, even though the cartridge is entirely omitted;

FIG. 5 is a somewhat diagrammatic plan view of the cartridge of FIG. 1, but with the cover plate removed to show internal construction;

FIG. 6 is a partial vertical sectional view of the cartridge of FIG. 5, taken generally along the line VI—VI of FIG. 5;

FIG. 7 is a partial somewhat diagrammatic plan view showing the cartridge of FIG. 5 in operating relation to cooperating parts of the tape transport of FIG. 4;

FIG. 8 is a somewhat diagrammatic plan view illustrating an endless loop cartridge transducer system; and FIG. 9 is a partial diagrammatic plan view illustratng the endless loop cartridge transducer system of FIG. 8 shifted into the operating condition.

DESCRIPTION OF THE PREFERRED EMBODIMENTS

FIGS. 1 and 2 of the present U.S. application are taken from the sixth sheet of drawings of the pending application Ser. No. 282,275, now Pat. No. 3,849,797, while FIGS. 3 and 4 are taken from the fifth sheet of drawings of said pending application, FIGS. 5 and 7 from the second sheet, and FIG. 6 from the eighth sheet. The description of preferred embodiments and figures of drawings of said U.S. Pat. No. 3,849,797 other than those corresponding to FIGS. 1–7 are incorporated herein by reference as nonessential subject matter for purposes of indicating the background of the invention. FIGS. 8 and 9 are from the third sheet of drawings of Camras, Application Ser. No. 60,806 now U.S. Pat. No. 3,725,608, and FIGS. 10 and 11 are from the third sheet of drawings of Ser. No. 831,352 now U.S. Pat. No. 3,686,433.

Description of FIGS. 1–4

So as to facilitate a correlation of FIGS. 1 through 4 with the prior disclosure of U.S. Pat. No. 3,849,797, the same reference numerals will be utilized as in the prior disclosure, where feasible.

FIG. 1 shows a box-like housing 601 for supporting a base plate 602 and for enclosing the portions of the transport apparatus below the base plate. In the illustrated embodiment base plate 602 supports pads (not shown) which have elements such as 307 for accommodating pivotal loading of cartridge 11 onto the cartridge support 302, FIG. 4. The cartridge support 302 includes a photocell assembly 303, FIG. 4, and pads 311 and 312 having upper surfaces in a common plane with the pads at the rear of the support 302 so as to provide level support for the cartridge 11. Spring fingers 313 and 314 are located at the forward edges of the pads 311 and 312 so that as the cartridge is pivoted downwardly into the operating position, spring fingers 313 and 314 insure the interlocking of the cartridge with overhanging fingers (not shown) at the rear of the cartridge support.

Referring to FIG. 2, it will be observed that the cartridge 11 has a run of tape at 25 which spans an aperture in the cartridge generally indicated at 156. The aperture 156 is of a configuration to receive a capstan drive assembly 301, FIGS. 1 and 4, within the confines of the cartridge and at the inner side of the tape path section 25.

A slide plate 317, FIG. 4, includes a pin 318 sliding within an elongated slot 319 as the slide plate is reciprocated from the loading position to the operating position as shown in FIG. 4. Slide plate 317 is provided with a cam edge 317a for actuating a microswitch arm 321 to start the capstan drive motor of capstan drive assembly 301 as the slide plate 317 reaches the operating position. Capstan pressure rollers such as indicated at 323, FIG. 4 are mounted for pivotal movement by means of linkage arms such at indicated at 324, FIG. 4, which are mounted on fixed pivots such as indicated at 328 carried by the support 302 clear of the path of movement of the slide plate 317.

Referring to FIGS. 1 and 2, the aperture 156 is of sufficient lateral extent so as to accommodate pressure rollers such as 323, FIG. 4, at each of the opposite sides of the capstan drive assembly 301. These pressure rollers serve to wrap the tape section 25 about the capstan drive assembly 301 and to press the tape into driving engagement with the capstan at each of the lateral sides of the capstan drive assembly 301. The means for positioning the capstan drive roller such as 323 within the cartridge 11 as the slide 317 is moved to the operating position includes cam arms 461 and 462, FIG. 4, mounted on pivot pins 463 and 464.

Wire springs such as indicated at 521, FIG. 4, act on the linkage arm parts such as 324 in such a way that the linkage arms assume "collapsed" configurations as the slide plate 317 is retracted to the loading position. These wire springs such as 521 also insure that the pressure rollers such as 323 will be properly guided by means of the guide faces such as 511a as the slide is moved to the operating position.

As indicated for the linkage arm 324, a flange strip such as indicated at 525 may be mounted so as to overlie the front edge of the cartridge 11 in operating position of the mechanism, so as to prevent any attempt to remove the cartridge prior to returning the mechanism to the load condition.

In view of the complete disclosure of the overall system as found in the referenced copending applications, it is considered that the forgoing general description will be entirely adequate for an understanding and appreciation of the preferred cartridge configuration of FIGS. 5–7, generic features of which are to be claimed herein.

CARTRIDGE OF FIGS. 5–7

FIG. 5 shows the cartridge 11 separated from the transducer mechanism of FIGS. 1 and 4, but with the top cover 11a removed to reveal the internal construction. Cover 532 of FIG. 2 is shown in position on the cartridge, the cover being shown in horizontal section.

In order to facilitate a correlation of the struction of FIGS. 5–7 with the structure of the copending applications, the same reference numerals have been utilized herein, where feasible.

Thus the front path section is designated by reference numeral 25, the cartridge having a bottom wall with an aperture 156 therein for receiving the capstan drive assembly 301 behind the tape loading path 25. The cartridge is also provided with an opening 11b in front of the loading path 25 for receiving idler rollers 323 and 323' into the cartridge at opposite sides of the capstan drive assembly 301 as illustrated in FIG. 7.

The bottom wall of the cartridge 11 is completely closed except for aperture 29 for receiving photocell 303 and the aperture 156.

A reel brake 92 is disposed within a recess in the bottom wall of the cartridge and cooperates with the peripheral edge of turntable 120 to secure the turntable against rotation when the cartridge is removed from the machine.

A tape drag element 94 is pivotally mounted at 95 within the cartridge and is provided with a felt pad 94a for pressing against the active surface of the magnetic record tape so as to press the inactive surface of the tape against a cooperating surface of fixed guide 96. Reel brake 92 and drag element 94 are shown contained within the cartridge 11, but the drag element 94 could be part of the transport mechanism.

Preferably, the photocell assembly 303 projects into the tape cartridge and carries at its lateral face 98 a photocell exciting lamp and a receiving photocell which is actuated in response to the light respective strip (not shown) applied to the tape when such strip reaches tape the run indicated at 99 in FIG. 7. In the absence of the reflective strip, the tape path section 99 does not reflect sufficient light to the photocell to actuate the photocell circuit.

The reel 120 is mounted for rotation on a central bearing with minimum friction. By way of example, the base plate 122 of the cartridge may have an upstanding bearing post as indicated at 123, and a bearing ball 124 may be interposed between the flat upper face of the bearing post 123, and a conically shaped seat carried by hub portion 125 of reel 120, so that the reel 120 is supported by means of the ball 124 for relatively free rotation on the post 123. An axially elongated sleeve of hub portion 125 closely receives post 123 to maintain the reel in a horizontal condition while freely accommodating rotation thereof. The details of this configuration are disclosed in U.S. Pat. No. 3,849,797.

The hub 125 of the reel 120 is made as light as possible consistent with structural rigidity and includes a central annular portion and an outer hub portion joined by thin radial arms such as indicated at 126. A lower radial flange 127 extends from the lower side of the hub 125 and mounts a coil 128 of record tape wound on the hub 125. The inner end of coil 128 extends over a contoured guide surface 130 formed of a low friction material. The tape engaging portion of the guide 130 is contoured so as to require a minimum distortion in the natural tape path from the inner side of coil 128 to the path between the tape drag elements 94 and 96. The tape after passing between the drag elements 94 and 96 passes about guide pins carried at the free ends of arms 132 and 133 which have fixed pivot points at 95 and 135 respectively. A bias spring (not shown) urges the arms 132 and 133 counterclockwise and clockwise respectively so as to maintain the tape adjacent the wall portions 137 and 138 of the cartridge and thus retain the tape section 25 in a relatively taut condition. From the pin of pivotal guide arm 133, the tape passes about a flanged guide post 140 and past aperture 29, and then about a flanged pin on tensioning arm 143 which is pivotally mounted at 144. From pivot shaft 144, the tape returns and is wound on the outer side of coil 128. A tension spring is indicated at 150 for urging a drag arm 151 in the counterclockwise direction about pivot point 95 so as to urge the movable drag element 94 toward the fixed drag element 96.

Referring to FIG. 5 the spring bias on arms 132 and 133 supplies sufficient tensioning action to the tape so that the tensioning arm 143 is held so as to place its spring under substantial torsion and thus maintain the free loop of the tape under tension. The reel 120 is held against rotation by means of the reel brake 92.

Cam post 4–93, FIG. 4, has a cam face which cooperates with a flange depending from arm 151 so as to release the clamp of drag element 94 when the cartridge is loaded on the tape transport of FIG. 1. The flange on arm 151 is so arranged as to maintain the drag element 94 in released condition until the head carriage reaches approximately 90% of its travel toward the engaged position shown in FIG. 4. The arm 151 is then released so as to allow the tension spring 150 to apply drag force on the tape between elements 94 and 96. Correspondingly, when the head carriage 317 is retracted, the drag force exerted by elements 94 and 96 is released substantially contemporaneously with the release of driving pressure between the tape and the capstan drive assembly 301. When the capstan stops driving, the take up tension of the tape as it winds on the outside of the coasting reel 120 is too low to overcome the drag of elements 94 and 96. Consequently if the drag at elements 94, 96 were not released, the rotation of the reel would supply a slack tape loop in advance of the drag elements 94 and 96 until such time as the coil 128 became too tight to permit further rotation of the reel. The slack loop might jam, while the tightened coil might disturb subsequent normal operation.

To stop the coasting reel smoothly and quickly, the brake 92 comprises a leather brake shoe engageable with the peripheral rim of flange 127. The brake element 92 is carried on an arm 153 which is pivoted on axis 154, and urged in the clockwise braking direction by the action of a wire spring 155. Pin 773, FIG. 4, on carriage 317 serves to release the brake as the carriage is advanced to the operating position.

As previously explained, the bottom wall 122 of the cartridge 11 is provided with an aperture as generally indicated at 156 so as to receive the capstan drive assembly 301 within the tape loop defined by tape sections 164, 25, and 99 as the cartridge is loaded onto the transport 601.

If the engaged position of the transport as indicated in FIG. 7, wire springs 512 and 513, FIG. 4, serve to urge the capstan pressure rollers 323 and 323' against the capstan so as to establish an isolated tape loop extending from an incoming side of the capstan drive 301 to an outgoing side of the capstan drive, the tape drag elements 94 and 96 acting on an incoming tape path section such as indicated at 164, and an outgoing tape path section such as indicated at 165 having essentially zero tension, but being sufficiently guided so as to pass in close proximity to the photocell assembly 303 which carries the lamp and photocell previously referred to. It will be noted that throughout the incoming tape path 164 from the inner side of coil 128 to the incoming side of the capstan drive assembly 301, the tape follows a path having a total amount of bending of substantially less than 90°, and in fact less than 45°, so as to enable a relatively free movement of tape. If the tape had a relatively substantial bend at the incoming path section, this would tend to amplify any flutter which might occur along the incoming path section. The tape drag elements 94 and 96 apply a relatively substantial drag force which in conjunction with the capstan drive assembly 301 provides a tape tension at the transducer head 380 in the range from about 1 to 4 ounces for a ¼ inch tape.

As seen in FIG. 6, the space between the level of flange 127 of reel 120 and the bottom wall 122 is appreciably less than the width of the tape (indicated at 128), for example 1/16 inch. The reel 120 might be one half to two thirds full where the length of tape was to provide 40 channels with a capacity of 1 hour of playing time at 120 inches per second. The constant friction supplied by the drag elements 94, 96 tends to swamp out any irregularities in tape motion, for example due to variations in the friction exerted by the coil 128 as the tape is unwound from the inner side thereof, and is important in proper guiding of the tape over the pressure rolls, capstan, and head.

As previously mentioned, a brake is applied to the capstan flywheel as soon as the capstan drive 301 is released by retraction of the capstan pressure rollers 323 and 323'. The tape remains somewhat loosely at the capstan when the rollers are retracted, but reengages perfectly if the rollers are brought again to drive position. The tape section 25 is brought to the taut condition shown in FIG. 5 when the cartridge is removed from the machine and the arms 132 and 133 return to the loading positions as shown in FIG. 5 under the impetus of their spring bias.

Referring to FIG. 7, pivotal loading of the cartridge 11 is accommodated by elements 304–307 carried by means of pads 309 and 310. The pads 309 and 310 have upper surfaces at the same level as the upper surfaces of pads 311 and 312, FIG. 4. As shown in detail in the copending applications, the bottom wall 122 of the cartridge is provided with recesses having rearwardly directed ledges for interengaging with forwardly projecting overhanging portions 304a and 305a of retaining lugs 304 and 305. The spring fingers 313 and 314 tend to press the cartridge rearwardly as it is pivoted downwardly so as to insure the interlocking of the cartridge with the overhanging fingers 304a and 305a of the lugs 304 and 305, and thus in the operating position of the cartridge shown in FIG. 7 tend to prevent the improper removal of the cartridge by lifting of the rear edge of the cartridge, for example.

The mounting of the capstan pressure rollers 323 and 323' corresponds to that discussed with respect to the roller 323, FIG. 4, and corresponds essentially to the description given for the pressure rollers in the first seven figures and tenth figure of said copending application Ser. No. 282,275.

FIG. 6 shows a cross-sectional view of the cartridge 11 with cover plate 720 in position to provide the top wall 11a of the cartridge. The cover 720 is a flat plate of generally rectangular configuration and removably secured to the remainder of the cartridge by means of screws. The cover is provided with a cut-out portion conforming with the contour of aperture 156 so as to receive the capstan drive assembly 301 within the tape loop including tape path section 25 as the cartridge is loaded onto the transport mechanism. The cover is also provided with a notch adjoining the cut-out portion so as to accommodate rollers 725 and 726, FIG. 4. The illustrated cover is further provided with an interiorly opening recess 730 which provides additional clearance for the portion of the tape path indicated at 164 in FIGS. 5 and 7. Also present in the illustrated embodiment is a ring segment 731 secured at the inner side of the cover 720 by means of screws. The ring 731 is made of a plastic material or the like having a smooth under surface 731a which is disposed in close conforming relation to the coil 128 so as to prevent escape of the coil 128 even when the cartridge is inverted. The ring 131 has a gap in the region of the incoming tape path section 164, FIG. 5, and the tape at this section departs from the inner side of coil 128 and passes upwardly and in sliding relation to guide surface 130 of a guide element 735. The element 735 is provided with a smooth under surface 735a which extends in overlying relation to the upper edges of the tape at coil 128, thus serving to retain the tape coil at the region of the gap in the ring 731. The element 735 is fixedly mounted by means of a plate 737 secured by means of a screw 738 to a wall part 739 of cartridge 11.

FIG. 6 also shows details of the bearing assembly for reel 120, which as previously mentioned is disclosed in U.S. Pat. No. 3,849,797. Thus, the base plate 122 has a bushing 741 secured thereto by means of screws 742 and fixedly mounting post 123. The hub 125 includes a liner 744 of cylindrical configuration and in close fitting relation to the external cylindrical surface of post 123 so as to maintain the reel 120 in the desired orientation while freely accommodating rotation thereof. Seat member 747 is secured to hub portion 125 by means of screws such as 748 and provides an interior conically shaped seat supported by ball 124.

As shown in FIG. 5, internal wall 739 of the cartridge provides a generally segmental cylindrical interior face 739a conforming with the circular contour of flange 127 at its outer periphery. Further interior wall portions 751 and 752 also serve to confine the tape to the desired path within the cartridge, this path being best illustrated in FIG. 5.

It will thus be understood that the present invention provides a cartridge adapted for coupling to a stable drive system, the cartridge having no rotating parts except for the tape turntable or reel 120 and requiring no rollers or precision parts that affect the drive accuracy. Thus guide element 735 providing the guide surface 130 is a fixed non-rotating member as are the other parts of the system which engage the tape in the operating mode as shown in FIG. 7. The drive which is accommodated by the cartridge is reliable and relatively free of maintenance requirements, using no belts or pulleys. The capstan drive configuration is such that the head 380 is freely movable from one edge of the tape to the other for scanning relation with a multiplicity of channels on the tape. The cartridge provides a resiliently biased drag element 94 with a pad 94a, FIG. 5, engaging the active surface of the tape for increasing the tape tension above that of the tension which would otherwise be present along the tape path prior to the first engagement of the tape with the capstan drive. By way of example, the cartridge may be of an extremely compact configuration having outside dimensions of about 8½ inches by 7 inches and depth dimension of about ¾ inch. As seen in FIG. 1, for example, the length dimension of the transport mechanism 601 is only slightly greater than the length dimensions of the cartridge 11, and the width dimension of the transport mechanism essentially corresponds to the width dimension of the cartridge. The height dimension of the transport mechanism as illustrated in FIG. 1 may be determined essentially by the overall height of the capstan drive motor and capstan drive assembly 301. The electronics except for the conventional circuitry of a broadcast television receiver 710 may all be contained within the housing 601, FIG. 1.

A common feature with the embodiment of FIGS. 8 and 9, to be hereinafter described, resides in the fact that the tape loop in the loading configuration as shown in FIG. 5 has approximately the same length as the tape loop in the operating path configuration shown in FIG. 7. This results from the provision of the tape guides 132 and 133 which serve to define the tape loop configuration and particularly the loading path section 25 thereof when the cartridge is detached from the machine as in FIG. 5, while providing for the shifting of the tape run to an operating path configuration by shifting movement of the tape guides.

Description of FIGS. 8 and 9

FIGS. 8 and 9 correspond to the seventeenth and eighteenth figures of my copending application Ser. No. 60,806 filed Aug. 4, 1970 now U.S. Pat. No. 3,725,608.

FIGS. 8 and 9 illustrate an endless tape cartridge 850 having an open end as indicated at 851 for receiving a transducer head 852 and idler rollers 854 and 855 of carriage 856. Capstan drive assembly 860 and tape reel assembly 861 may conform with the details explained in connection with the fifth, sixth, and seventh figures of said application 60,806, for example. Stationary members 869 and 870 may provide cam surfaces for the pivotally mounted arms of idler rollers 854 and 855, and members 869 and 870 may also provide guidance for the reciprocal movement of carriage 856.

As seen in FIG. 8, tape guide elements 872 and 873 are carried on mounting arms 874 and 875 which are pivotally mounted at 876 and 877 within cartridge 850. Tension springs 881 and 880 urge arms 875 and 874 respectively in a clockwise and in a counterclockwise direction so as to provide a tape threading path as indicated at 884 for record tape 885.

As carriage 856 is advanced to the operative transducing position indicated in FIG. 9, idler rollers 854 and 855 engage guide elements 872 and 873 so as to begin moving the same toward the inward positions, herein termed the operating positions indicated in FIG. 9. Pins 890 and 891 then engage arms 874 and 875 to complete the inward movement of the arms to the position shown in FIG. 9. Conversely, as the carriage 856 is retracted, the arms 874 and 875 return to the initial positions, herein termed the loading positions, indicated in FIG. 8 which may, for example, be determined by the positions of respective stop pins 893 and 894. Because of the capstan of the drive assembly 860 tends to continue rotation to drive the tape in the direction of arrow 892, FIG. 9, during retraction of carriage 856, the tape 885 will reliably assume the initial threading path indicated at 884 in FIG. 8 with clearance from the capstan drive assembly 860 to facilitate loading and unloading of the cartridge 850. Where carriage plate 856 slides on top of bottom wall 896 of cartridge 850, the aperture 896a in the bottom wall 896 need only be sufficiently large to accommodate the capstan drive assmembly 860.

Summarizing operation of the embodiment of FIGS. 8 and 9, cartridge 850 is loaded over capstan drive assembly 860 by means of aperture 896a in bottom wall 896 of the cartridge. As carriage 856 advances into the cartridge to the transducing position indicated in FIG. 9, arms 874 and 875 carrying guide elements 872 and 873 shift to the operating position shown in FIG. 9 to provide a relatively smooth transducing path for tape 885 as indicated at 898 in FIG. 9. This arrangement avoids relatively sharp bends in the transducing path of the tape in the operating condition of the cartridge.

The capstan drive assembly 860 and idler rollers 854 and 855 may have any of the configurations referred to in my U.S. Pat. No. 3,725,608.

Referring to the embodiment of FIGS. 8 and 9, it will be observed that the operating tape path or tape run for the tape extending exterior to coil 899 from the inner side of the coil through the transport to the outer side of the coil, has a length approximately equal to the length of the threading tape path or tape run shown at 884, FIG. 8, because of the shifting of guides 872 and 873. By proper arrangement of the guides, substantial change in the condition of coil 899 is avoided during movement of idler rollers 854 and 855 to the operating position. The guides 872 and 873 may alternatively clamp the tape against side wall members when in the released or loading condition as for example a lid at opening 851.

A locking arrangement prevents the cartridge from being released until the carriage 856 is free and the tape is in the loading position. For example in FIG. 9 the carriage 856 overlies the bottom wall 896 of the cartridge, preventing it from disengagement until it assumes the configuration of FIG. 8.

The various guide pins may be flanged for side-guidance of the tape.

As the carriage 856 is retracted to the loading position, the continued driving of the record tape applies tension to the run of the tape between the inner and outer sides of the coil because of the greater winding diameter of the take-up periphery of the coil which thus takes up slack in the exposed run of tape. The endless coil configuration is such, however, that there is still sufficient looseness or slack in the coil of the record tape on the reel.

It may be noted that the cartridge need not be operated at slow speed such as 30 inches per second since the cartridge will operate well at 120 inches per second, for example. The endless tape cartridge is provided with suitable guides for peeling the tape from the inner periphery of the coil and for guiding the tape along the general path shown. The reel or hub for coil 899 is tapered inwardly with respect to the direction toward the bottom wall 896 of the cartridge, to have shape of an inverted cone frustrum.

Proper tension of the tape at the transducer head may also be obtained by increasing the tape tension outside of the loop about the capstan drive assembly 860. A friction surfaced capstan may be used with adequate wrap of the tape loop thereabout, in which case the idler rollers may be omitted.

The embodiment of FIGS. 8 and 9 may be used for video recording and reproduction, for example of broadcast television signals. The tape transport may be built economically for home use or for educational purposes. It is also suitable for instrumentation, audio and other applications where extremely steady drive is required. Special advantages include the following. (1)The flutter is so low that the signal may be utilized by an ordinary television receiving set without alternation of the sync circuits. This allows a video tape player to play through any television set with no connections except to the antenna terminals of the television set, or alternatively the video tape player unit can radiate a weak signal that picked up by the set with no interconnection at all. (2)A continuous loop cartridge with a large number of parallel tracks (for example 30) gives rapid access to separate programs. For example, 30 "single concept" educational features may be recorded on a tape ¼ inch wide. Each feature plays over and over again, until a different feature is selected by moving the head laterally to a different track. A video juke box can be implemented in this way. (3)The cartridge can display a long continuous program by automatically stepping to the next track whenever the tape loop completes a passage. See for example by U.S. Pat. No. 2,857,164. (4)A cartridge is very convenient for loading the tape recorder and storing and protecting the records. (5)The cartridge drive is very simple and can be built precisely as a motor assembly on which the head and pressure roller carriage is mounted, this constituting practically the entire tape transport.

The steadiness of the capstan drive is attributable to the unitary assembly of motor, flywheel and capstan, which is treated as a unit, being finish-ground and dynamically balanced as one piece and suspended between bearings at the extremes. The tape at the transducer head runs over a tape guide having a crescent shaped section fitted against the capstan. The crescent guide supports the tape practically completely so that it cannot vibrate. The crescent guide allows the tape to be wrapped about the transducer head with substantially no unsupported tape, and allows the head to move laterally for channel selection.

When the basic assembly is used with an endless loop cartridge, only the base plate with an engaging system for the cartridge is required for the mechanical part of the recorder. Operation in only one direction simplifies the motor and the tensioning system.

A reasonable tension should be developed in the tape where it contacts the head, as for example 1 to 4 ounces for tape ¼ inch wide.

I claim as my invention:

1. A tape cartridge assembly comprising a cartridge having a bottom wall with an aperture therein for providing access to the interior of the cartridge, having a front side in front of said aperture, and having a capstan receiving space interiorly thereof and in alignment with the aperture in said bottom wall with respect to a direction substantially normal to the bottom wall for accommodating a capstan drive assembly having an axis of rotation substantially normal to the bottom wall and extending into said cartridge through said aperture in said bottom wall, a reel mounted in said cartridge rearwardly of said aperture and rotatable on a central axis thereof disposed substantially normal to said bottom wall, a coil of record tape wound on said reel and a length of such record tape extending from the inner side of said coil to and along a tape loading path at said front side of said cartridge in front of said aperture, and extending from the tape loading path to the outer side of the coil, such that the tape is in the form of an endless loop with the length of tape being adapted to extend about a capstan drive assembly at the capstan receiving space of the cartridge, shiftable tape guide elements mounted in said cartridge for movement from respective loading positions to respective retracted positions, said tape guide elements having respective tape engaging faces located adjacent the respective opposite sides of said aperture at the front side of said cartridge in the respective loading positions of said tape guide elements, and operable for engaging the length of tape to hold the tape at said tape loading path while said tape guide elements are in the respective loading positions, said tape guide elements in the respective retracted positions conditioning the cartridge for a video transducing operation and accommodating an operating tape path extending about the capstan receiving space at an operating level above said bottom wall during a video transducing operation, said tape guide elements in the respective loading positions being disposed with said tape engaging faces thereof substantially parallel to the central axis of the reel and substantially normal to the plane of the bottom wall of the cartridge and at a level relative to the bottom wall substantially corresponding to the operating level of the record tape at the capstan receiving space of the cartridge during a video transducing operation, means comprising said tape guide elements in the respective retracted positions providing a configuration for said operating tape path accommodating transport of the record tape at a video transducing speed, and means guiding the movement of said tape guide elements from the respective retracted positions to the respective loading positions for shifting the tape from the said operating tape path to the loading path without substantially changing the level of the tape relative to the bottom wall of said cartridge.

2. A cartridge assembly according to claim 1 with the tape guide elements in the respective loading positions providing a tape path section extending from the inner side of said coil to said loading tape path with at least one relatively sharp bend therein and said tape guide elements in the respective retracted positions accommodating an operating tape path section extending relatively directly to said capstan receiving space from the inner side of said coil and without any bends therein as sharp as said relatively sharp bend, thereby to accommodate smooth flutter-free motion of the record tape along said operating tape path section at a video transducing speed of at least thirty inches per second.

3. A cartridge assembly according to claim 1 with said length of tape which extends from the inner side of said coil to and along said loading path and then to the outer side of said coil in the respective loading positions of said tape guide elements having substantially a first overall length dimension, and with the operating tape path which extends from the inner side of the coil to an about the capstan receiving space and back to the outer side of the reel during a video transducing operation having a second overall length dimension approximately equal to said first overall length dimension.

4. A cartridge assembly according to claim 1 with the length of tape which extends from the inner side of the coil to the loading path in the respective loading positions of the tape guide elements forming substantially a right angle bend about one of the tape guide elements which engages such length of tape prior to the loading path, and such one tape guide element in its retracted position accommodating a relatively substantially more direct tape path between the inner side of said coil and the capstan receiving region such as to accommodate substantially flutter-free tape motion at a video transducing speed of the order of 120 inches per second.

* * * * *